United States Patent
Kim et al.

(10) Patent No.: US 12,468,079 B2
(45) Date of Patent: Nov. 11, 2025

(54) POLARIZING PLATE AND OPTICAL DISPLAY APPARATUS COMPRISING THE SAME

(71) Applicant: SAMSUNG SDI CO., LTD., Yongin-si (KR)

(72) Inventors: Jin Woo Kim, Suwon-si (KR); Ki Yong Kim, Suwon-si (KR); Kyoung Min Cho, Suwon-si (KR); Dong Ho Wee, Suwon-si (KR)

(73) Assignee: Wuxi Hengxin Optoelectronic Materials Co., Ltd., Wuxi (CN)

( * ) Notice: Subject to any disclaimer, the term of this patent is extended or adjusted under 35 U.S.C. 154(b) by 414 days.

(21) Appl. No.: 18/301,752

(22) Filed: Apr. 17, 2023

(65) Prior Publication Data
US 2023/0341601 A1    Oct. 26, 2023

(30) Foreign Application Priority Data
Apr. 26, 2022    (KR) ........................ 10-2022-0051352

(51) Int. Cl.
*G02B 5/30*     (2006.01)
*G02F 1/1335*    (2006.01)

(52) U.S. Cl.
CPC ....... *G02B 5/305* (2013.01); *G02F 1/133528* (2013.01)

(58) Field of Classification Search
CPC ...................................................... G02B 5/305
See application file for complete search history.

(56) References Cited

U.S. PATENT DOCUMENTS

2020/0073036 A1\* 3/2020 Wee ........................ G02B 5/305
2020/0073172 A1\* 3/2020 Wee ................... G02F 1/133526

FOREIGN PATENT DOCUMENTS

KR    10-2018-0047569 A    5/2018

\* cited by examiner

*Primary Examiner* — Edmond C Lau
(74) *Attorney, Agent, or Firm* — Ricky Lam

(57) ABSTRACT

Disclosed herein are a polarizing plate and an optical display apparatus including the same. A polarizing plate includes: a polarizer; and a patterned portion including a first resin layer and a second resin layer stacked on at least one surface of the polarizer and having different indexes of refraction, and the first resin layer is a patterned layer including: multiple first optical patterns formed at intervals at an interface with the second resin layer; and one or more second optical patterns formed between each pair of adjacent first optical patterns, and the first optical pattern and the second optical pattern satisfy Relations 1 to 3 set forth herein.

20 Claims, 5 Drawing Sheets

POLARIZING PLATE AND OPTICAL DISPLAY APPARATUS COMPRISING THE SAME

CROSS-REFERENCE TO RELATED APPLICATION

This application claims priority to and the benefit of Korean Patent Application No. 10-2022-0051352, filed on Apr. 26, 2022 in the Korean Intellectual Property Office, the entire disclosure of which is incorporated herein by reference.

SUMMARY

1. Field

Aspects of embodiments of the present invention relate to a polarizing plate and an optical display apparatus including the same.

2. Description of the Related Art

A liquid crystal display is operated by allowing light emitted from a backlight unit to propagate through a liquid crystal panel. Accordingly, the liquid crystal display exhibits good contrast ratio (CR) when viewed from the front of a screen thereof. However, the liquid crystal display exhibits poor contrast ratio when viewed from the side of the screen, as compared with when viewed from the front of the screen. Thus, a method of using a patterned film having a predetermined shape is being considered in order to improve contrast ratio and viewing angle.

A liquid crystal display is switchable between an operation state and a non-operation state. When the liquid crystal display is in the operation state, improvement in contrast ratio and viewing angle is critical in order to display a high-quality image on a screen of the liquid crystal display. On the other hand, when the liquid crystal display is in the non-operation state, reduction in reflective rainbow caused by external light is critical. When fluorescent light or three-wavelength light is projected on the screen of the liquid crystal display in the non-operation state from a short distance or a long distance from the liquid crystal display, reflective rainbow as shown in FIG. 6 and FIG. 7 occurs on the screen of the liquid crystal display, resulting in poor appearance of the screen. As shown in FIG. 6 and FIG. 7, when external light is incident on the screen of the liquid crystal display, the screen of the liquid crystal display can exhibit poor appearance due to scattering of the external light from the screen, which is black.

Therefore, there is a need for a solution to overcome the above problems relating to both the non-operation state and the operation state of a liquid crystal display. Conventionally, a method of adding an antireflection film or a low reflectivity film to a viewer-side polarizing plate has been considered. However, addition of such a separate functional film causes an increase in thickness of the polarizing plate while requiring additional related processes.

The background technique of the present invention is disclosed in Korean Patent Laid-open Publication No. 10-2018-0047569.

SUMMARY OF THE INVENTION

According to an aspect of embodiments of the present invention, a polarizing plate which can improve contrast ratio and viewing angle in front side and lateral sides, when an optical display apparatus including the polarizing plate is in an operation state, is provided.

According to another aspect of embodiments of the present invention, a polarizing plate which can reduce reflective rainbow, when an optical display apparatus including the polarizing plate is in a non-operation state, is provided.

An aspect of one or more embodiments of the present invention relates to a polarizing plate.

According to one or more embodiments, a polarizing plate includes: a polarizer; and a patterned portion including a first resin layer and a second resin layer stacked on at least one surface of the polarizer, the first resin layer having a different index of refraction from the second resin layer, wherein the first resin layer is a patterned layer comprising: multiple first optical patterns formed at intervals (e.g., predetermined intervals) at an interface with the second resin layer; and one or more second optical patterns formed between each pair of adjacent first optical patterns, the first optical pattern has two opposite side surfaces each at least including a first side surface having a base angle ($\theta1$), and the first optical pattern and the second optical pattern satisfy the following Relations 1 to 3:

$$0.1\ \mu m \leq m2 \leq m1 \times 0.2, \quad (1)$$

$$0.1\ \mu m \leq w2 \leq w1 \times 0.5, \quad (2)$$

$$0.1\ \mu m \leq h2 \leq h1 \times 0.2, \quad (3)$$

where m1 is a minimum width (unit: μm) between the opposite first side surfaces of the first optical pattern, w1 is a maximum width (unit: μm) between the opposite first side surfaces of the first optical pattern, h1 is a minimum distance (unit: μm) between the minimum width and the maximum width of the first optical pattern, m2 is a maximum width (unit: μm) of a second surface formed at a top portion of the second optical pattern, w2 is a maximum width (unit: μm) of the second optical pattern, and h2 is a maximum height (unit: μm) of the second optical pattern.

Another aspect of one or more embodiments of the present invention relates to an optical display apparatus.

According to one or more embodiments, an optical display apparatus includes the polarizing plate according to an embodiment of the present invention.

Embodiments of the present invention provide a polarizing plate which can improve contrast ratio and viewing angle in front side and lateral sides when an optical display apparatus including the polarizing plate is in an operation state.

Further, embodiments of the present invention provide a polarizing plate which can reduce reflective rainbow when an optical display apparatus including the polarizing plate is in a non-operation state.

DETAILED DESCRIPTION

Figure 1:
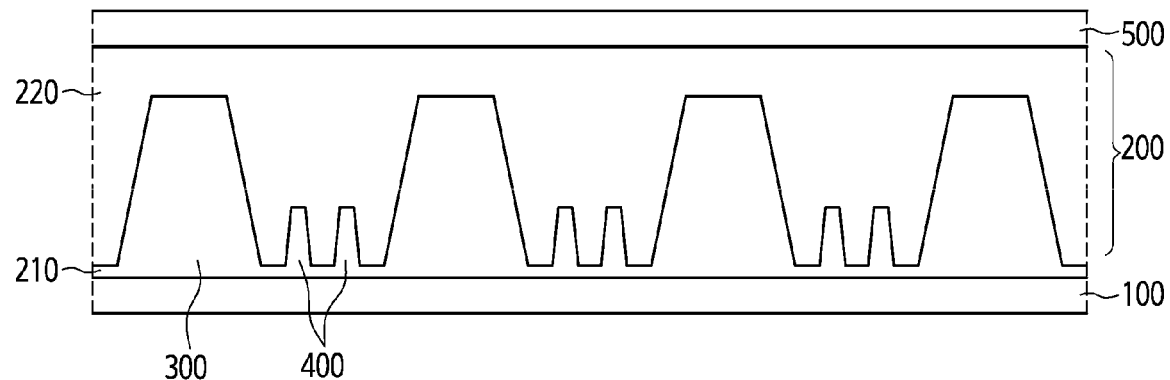
FIG. 1 is a cross-sectional view of a polarizing plate according to an embodiment of the present invention.

Herein, some embodiments of the present invention will be described in further detail with reference to the accompanying drawings such that the present invention can be easily implemented by those skilled in the art. It is to be understood that the present invention may be embodied in different ways and is not limited to the following embodiments.

In the drawings, portions irrelevant to the description may be omitted for clarity. Like components will be denoted by like reference numerals throughout the specification.

Herein, spatially relative terms, such as "upper" and "lower," are defined with reference to the accompanying drawings. Thus, it is to be understood that "upper surface" can be used interchangeably with "lower surface." In addition, when an element, such as a layer or film, is referred to as being placed "on" another element, it may be directly placed on the other element, or one or more intervening elements may be present. On the other hand, when an element is referred to as being placed "directly on" another element, there are no intervening element(s) therebetween.

Herein, "in-plane retardation (Re)" is a value measured at a wavelength of 550 nm, as calculated according to the following Equation A:

$$Re = (nx - ny) \times d, \quad (A)$$

where nx and ny are indexes of refraction of a protective layer, as measured in the slow axis- and fast axis-directions thereof at a wavelength of 550 nm, respectively, and d is a thickness (unit: nm) of the protective layer.

Herein, the term "(meth)acryl" refers to acryl and/or methacryl.

As used herein to represent a specific numerical range, the expression "X to Y" means "≥X and ≤Y".

Embodiments of the present invention provide a polarizing plate which can improve contrast ratio and viewing angle in front and lateral sides in an operation state while reducing reflective rainbow in a non-operation state. The polarizing plate according to the present invention can improve appearance of an optical display apparatus including the polarizing plate by reducing reflective rainbow in the non-operation state without adversely affecting improvement in contrast ratio and viewing angle. Here, "operation state" refers to a state in which an optical display apparatus employing the polarizing plate is turned on, and "non-operation state" refers to a state in which an optical display apparatus employing the polarizing plate is turned off.

In one or more embodiments, the polarizing plate according to the present invention can achieve all of the aforementioned effects without having a functional film (including an antireflection layer, a low-reflectivity layer, or an ultra-low-reflectivity layer) disposed on a surface of the polarizing plate, on which external light is incident first. Here, "external light" refers to natural light incident on the polarizing plate.

The polarizing plate according to one or more embodiments of the present invention includes: a polarizer; and a patterned portion including a first resin layer and a second resin layer stacked on at least one surface of the polarizer, the first resin layer having a different index of refraction from the second resin layer, wherein the first resin layer is a patterned layer including: multiple first optical patterns formed at intervals (e.g., predetermined intervals) at an interface with the second resin layer; and one or more second optical patterns formed between adjacent first optical patterns, the first optical pattern has two opposite side surfaces each at least including a first side surface having a base angle (θ1), and the first optical pattern and the second optical pattern satisfy Relations 1 to 3 described below.

Herein, a polarizing plate according to some embodiments of the present invention will be described with reference to FIG. 1 to FIG. 5.

A polarizing plate according to an embodiment may include a polarizer 100, a patterned portion 200, and a first protective layer 500.

The patterned portion 200 may be formed on a light exit surface or a light incidence surface of the polarizer 100. In an embodiment, the patterned portion 200 is formed on the light exit surface of the polarizer 100 so as to easily achieve the desired effects of the present invention. Herein, the "light exit surface" refers to a surface of the polarizer 100 through which light (internal light) emitted from a backlight unit including a light source and having entered the polarizer exits the polarizer. In addition, the "light incidence surface" refers to a surface of the polarizer through which light (internal light) emitted from the backlight unit enters the polarizer. That is, the light exit surface and the light incidence surface are determined with reference to light (internal light) emitted from the backlight unit.

When used in an optical display apparatus, particularly a liquid crystal display apparatus, the polarizing plate according to the present invention may be used as a viewer-side polarizing plate so as to reduce reflective rainbow. However, it will be understood that the present invention is not limited thereto.

Patterned Portion

The patterned portion 200 may include a first resin layer 210 and a second resin layer 220 sequentially stacked on the light exit surface of the polarizer 100.

The first resin layer 210 and the second resin layer 220 have different indexes of refraction. This can improve contrast ratio and viewing angle when light having entered the patterned portion 200 exits the patterned portion 200. In an embodiment, a difference in index of refraction between the first resin layer 210 and the second resin layer 220 may be 0.5 or less, for example, 0.01, 0.1, 0.15, 0.2, 0.25, 0.3, 0.35, 0.4, 0.45, or 0.5, for example, 0.01 to 0.3. Within this range, improvement in visibility and contrast ratio by a first optical pattern can be achieved.

In an embodiment, among the first resin layer 210 and the second resin layer 220, a resin layer having a higher index of refraction may have an index of refraction of 1.5 or more, for example, 1.5 to 1.7. In addition, among the first resin layer 210 and the second resin layer 220, a resin layer having a lower index of refraction may have an index of refraction of less than 1.5, for example, 1.3 to less than 1.5. Within this range, the difference in index of refraction between the first resin layer 210 and the second resin layer 220 can easily fall within the above range.

In an embodiment, the first resin layer 210 has a lower index of refraction than the second resin layer 220.

The first resin layer 210 and the second resin layer 220 may directly adjoin each other.

The first resin layer 210 is a patterned layer and, in an embodiment, may have a minimum thickness s1 of 10 µm or less, for example, 0 µm, 1 µm, 2 µm, 3 µm, 4 µm, 5 µm, 6 µm, 7 µm, 8 µm, 9 µm, or 10 µm, and, in an embodiment, 0 µm to 10 µm or 0 µm to 5 µm. Within this range, the first resin layer 210 can be stably formed on the polarizer 100. Herein, the minimum thickness s1 is defined as a minimum distance between upper and lower surfaces of the first resin layer 210.

The second resin layer 220 may be a patterned layer formed on the first resin layer 210 to fill a gap between an upper surface of the patterned portion 200 and a light exit surface of the first resin layer 210. In an embodiment, the second resin layer 220 may have a minimum thickness s2 of 10 µm or less, for example, 0 µm, 1 µm, 2 µm, 3 µm, 4 µm, 5 µm, 6 µm, 7 µm, 8 µm, 9 µm, or 10 µm, and, in an embodiment, greater than 0 µm to 10 µm or greater than 0 µm to 5 µm. Within this range, the second resin layer 220 can be stably formed on the polarizer 100. Herein, the minimum thickness s2 is defined as a minimum distance between upper and lower surfaces of the second resin layer 220.

Each of the first resin layer 210 and the second resin layer 220 may be formed of a photocurable or thermosetting composition capable of ensuring that each of the first resin layer 210 and the second resin layer 220 has an index of refraction within the above range. For example, the composition may include a (meth)acrylic resin, a polycarbonate resin, and an epoxy resin, without being limited thereto.

The first resin layer 210 is a patterned layer including: multiple first optical patterns 300 formed at intervals (e.g., predetermined intervals) at an interface with the second resin layer 220; and one or more second optical patterns 400 formed between adjacent first optical patterns 300. The first optical pattern 300 has two opposite side surfaces. Each of the side surfaces of the first optical pattern 300 has at least a first side surface 302 having a base angle 81. The first optical pattern 300 and the second optical pattern 400 satisfy the following Relations 1 to 3:

$$0.1 \ \mu m \leq m2 \leq m1 \times 0.2, \quad (1)$$

$$0.1 \ \mu m \leq w2 \leq w1 \times 0.5, \quad (2)$$

$$0.1 \ \mu m \leq h2 \leq h1 \times 0.2, \quad (3)$$

where m1 is a minimum width (unit: µm) between the opposite first side surfaces of the first optical pattern, w1 is a maximum width (unit: µm) between the opposite first side surfaces of the first optical pattern, h1 is a minimum distance (unit: µm) between the minimum width and the maximum width of the first optical pattern, m2 is a maximum width (unit: µm) of a second surface formed at a top portion of the second optical pattern, w2 is a maximum width (unit: µm) of the second optical pattern, and h2 is a maximum height (unit: µm) of the second optical pattern.

Relations 1 to 3 provide that both improvement in contrast ratio and viewing angle and prevention or substantial prevention of reflective rainbow can be achieved using only an optical pattern formed at the interface between the first resin layer and the second resin layer. When Relations 1 to 3 are all satisfied, the polarizing plate according to the present invention can improve contrast ratio and viewing angle in front and lateral sides in the operation state while reducing reflective rainbow in the non-operation state. If any of Relations 1 to 3 is not satisfied, the polarizing plate according to the present invention cannot provide or insufficiently provides the aforementioned effects in each of the operation state and the non-operation state.

Through formation of one or more second optical patterns satisfying all of Relations 1 to 3 at at least one side of the first optical pattern, the polarizing plate according to the present invention can effectively prevent or substantially prevent occurrence of reflective rainbow, as compared with a polarizing plate having a second optical pattern that does not satisfy all of Relations 1 to 3, without adversely affecting improvement in contrast ratio and viewing angle by the first optical pattern formed at the interface between the first resin layer and the second resin layer.

In particular, the polarizing plate according to embodiments of the present invention can prevent or substantially prevent occurrence of reflective rainbow without needing to additionally form an antireflection layer or a low reflectivity layer providing an antireflection effect on the light exit surface of the patterned portion 200 or the light exit surface of the first protective layer 500, thereby allowing reduction in thickness of the polarizing plate and simplification of a manufacturing process of the polarizing plate.

In an embodiment, in Relation 1, m2/m1 may be greater than 0 to 0.2, for example, 0.01, 0.02, 0.03, 0.04, 0.05, 0.06, 0.07, 0.08, 0.09, 0.1, 0.11, 0.12, 0.13, 0.14, 0.15, 0.16, 0.17, 0.18, 0.19, or 0.2.

In an embodiment, in Relation 2, w2/w1 may be greater than 0 to 0.5, for example, 0.01, 0.02, 0.03, 0.04, 0.05, 0.06, 0.07, 0.08, 0.09, 0.1, 0.11, 0.12, 0.13, 0.14, 0.15, 0.16, 0.17, 0.18, 0.19, 0.2, 0.21, 0.22, 0.23, 0.24, 0.25, 0.26, 0.27, 0.28, 0.29, 0.3, 0.31, 0.32, 0.33, 0.34, 0.35, 0.36, 0.37, 0.38, 0.39, 0.4, 0.41, 0.42, 0.43, 0.44, 0.45, 0.46, 0.47, 0.48, 0.49, or 0.5.

In an embodiment, in Relation 3, h2/h1 may be greater than 0 to 0.2, for example, 0.01, 0.02, 0.03, 0.04, 0.05, 0.06, 0.07, 0.08, 0.09, 0.1, 0.11, 0.12, 0.13, 0.14, 0.15, 0.16, 0.17, 0.18, 0.19, or 0.2.

The second optical pattern 400 is formed at at least one side of the first optical pattern 300 with a space between the second optical pattern 400 and the first optical pattern 300. The second optical pattern 400 may be formed between each pair of adjacent first optical patterns 300. In this way, the second optical pattern 400 can prevent or substantially prevent occurrence of reflective rainbow.

The second optical pattern 400 may be formed to a maximum width (e.g., a predetermined maximum width) over a certain area of a flat region between adjacent first optical patterns 300. Here, a ratio of the sum of the maximum widths w2 of the one or more second optical patterns 400 formed between adjacent first optical patterns 300 to an overall width w3 of a region (e.g., a flat region) between adjacent first optical patterns 300 may be 20% to 90%, for example, 20%, 25%, 30%, 35%, 40%, 45%, 50%, 55%, 60%, 65%, 70%, 75%, 80%, 85%, or 90%, and, in an embodiment, 30% to 75%. Within this range, the second optical pattern 400 can easily achieve the desired effects of the present invention.

Figure 2:
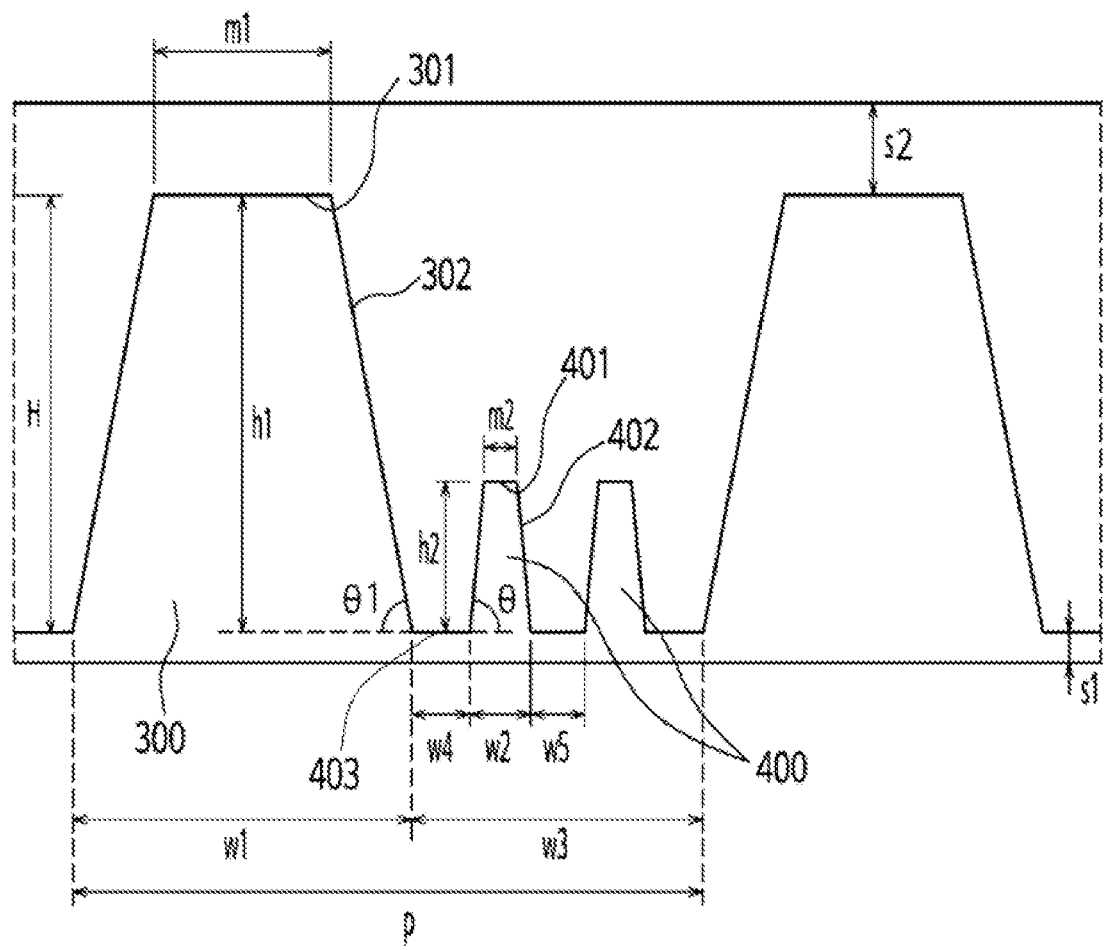
FIG. 2 is a partially enlarged cross-sectional view of a patterned portion of the polarizing plate of FIG. 1 in a transverse direction of an optical pattern of the polarizing plate, according to an embodiment of the present invention.

In an embodiment, the second optical pattern 400 may be formed at both sides of the first optical pattern 300 with a space between the second optical pattern 400 and the first optical pattern 300, as shown in FIG. 2.

Figure 5:
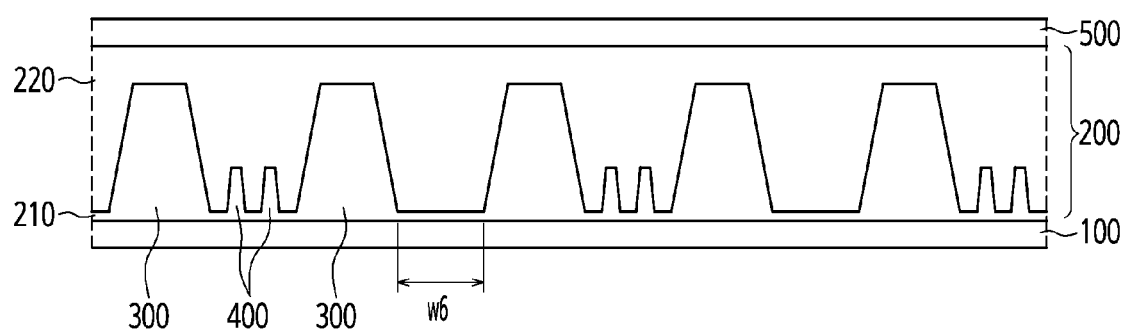
FIG. 5 is an enlarged cross-sectional view of a polarizing plate according to another embodiment of the present invention.
Figure 6:
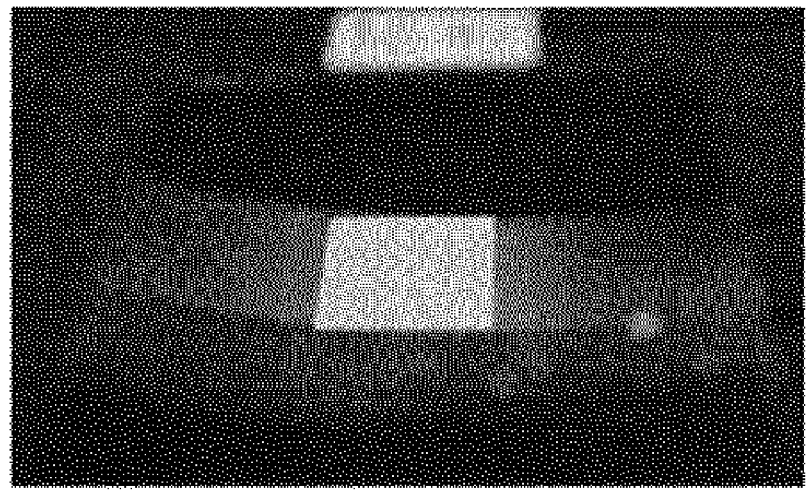
FIG. 6 is an image showing occurrence of reflective rainbow on a display apparatus including a conventional polarizing plate under illumination with fluorescent light from a long distance, wherein the conventional polarizing plate has only a first optical pattern according to the present invention without having a second optical pattern according to the present invention.
Figure 7:
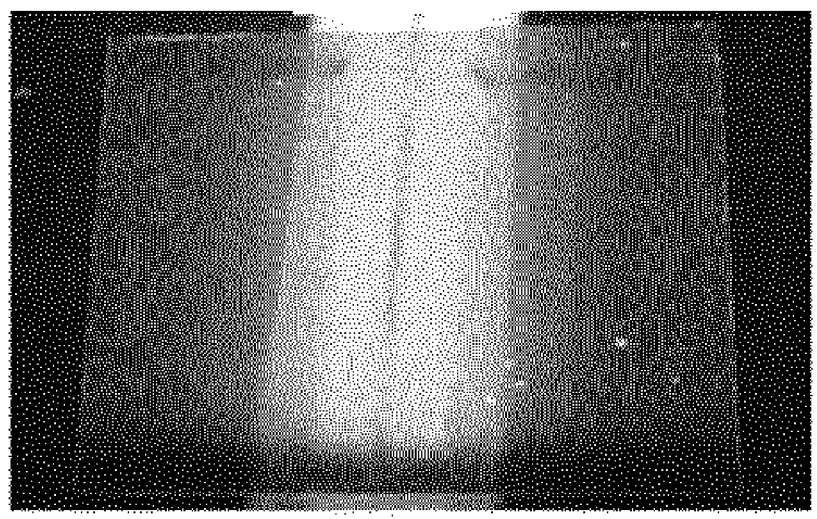
FIG. 7 is an image showing occurrence of reflective rainbow on a display apparatus including a conventional polarizing plate under illumination with 3-wavelength light from a short distance, wherein the conventional polarizing plate has only the first optical pattern without having the second optical pattern.

In another embodiment, the second optical pattern 400 may be formed at only one side of the first optical pattern 300 with a space between the second optical pattern 400 and the first optical pattern 300, as shown in FIG. 5. In this case, in some of the flat regions of the patterned portion between respective pairs of adjacent first optical patterns 300, for example, a flat region w6 (see FIG. 5), there may be no second optical pattern 400.

In some embodiments, w3 may be 0.1 μm to 8.0 μm, and, in an embodiment, 1.0 μm to 7.0 μm. Within this range, improvement in viewing angle can be achieved.

The flat region includes two or more flat surfaces.

The first optical pattern 300 is spaced apart from the second optical pattern 400 by a first flat surface 403, wherein a minimum distance between the first optical pattern 300 and the second optical pattern 400, that is, a width w4 of the first flat surface 403 may be 0.1 μm to 5.0 μm, and, in an embodiment, 0.5 μm to 3.0 μm. Within this range, improvement in viewing angle and contrast ratio can be achieved.

One or more, and, in an embodiment, two or more, and, in an embodiment, two to three second optical patterns 400 may be formed between each pair of adjacent first optical patterns 300. When two or more second optical patterns 400 are formed between each pair of adjacent first optical patterns 300, the desired effects of the present invention can be easily achieved. Here, the second optical patterns 400 may be spaced apart from each other. When there are two or more second optical patterns 400 between each pair of adjacent first optical patterns 300, the second optical patterns 400 may be spaced apart from each other, as shown in FIG. 1, or may be right next to each other without any space therebetween (that is, a distance therebetween is 0 μm).

The first resin layer 210 includes multiple pattern groups each including the first optical pattern 300 and the second optical pattern 400, wherein a distance w5 between a pair of adjacent second optical patterns 400 may be the same or different in each pattern group. When the distance w5 between a pair of adjacent second optical patterns 400 is the same in each pattern group, the desired effects of the present invention can be easily achieved. In an embodiment, w5 may be 0 μm to 5 μm.

Next, the first optical pattern 300 will be described in further detail.

First Optical Pattern

The first optical pattern 300 includes multiple first optical patterns 300, wherein each of the multiple first optical patterns 300 is spaced apart from the second optical pattern 400 by a flat surface.

The first optical pattern 300 is an embossed pattern protruding from the first resin layer 210 toward the second resin layer 220.

The first optical pattern 300 has two opposite side faces, or surfaces. Each of the side surfaces at least has a first side surface 302 having a base angle θ1. Here, the first side surface 302 is defined as a side surface of the first optical pattern 300, which is directly connected to the first flat surface 403.

In an embodiment, the base angle θ1 may be 60° to 90°, for example, 60°, 61°, 62°, 63°, 64°, 65°, 66°, 67°, 68°, 69°, 70°, 71°, 72°, 73°, 74°, 75°, 76°, 77°, 78°, 79°, 80°, 81°, 82°, 83°, 84°, 85°, 86°, 87°, 88°, 89°, or 90°, and, in an embodiment, 65° to 85°. Within this range, the first optical pattern 300 can improve contrast ratio and visibility.

The first side surface 302 may be flat or curved. For example, the first side surface 302 may be a single flat surface, as shown in FIG. 2. In another embodiment, the first side surface 302 may be a single curved surface. When the first side surface 302 is a curved surface, the first side surface 302 may be convex in a direction from the first resin layer 210 toward the second resin layer 220 or in a direction from the second resin layer 220 toward the first resin layer 210.

In an embodiment, in the first optical pattern 300, m1 may be 0.1 μm to 9.0 μm, and, in an embodiment, 2.0 μm to 7.0 μm. Within this range, Relation 1 can be easily satisfied and improvement in viewing angle and contrast ratio can be easily achieved.

In an embodiment, in the first optical pattern 300, w1 may be 2.0 μm to 15.0 μm, and, in an embodiment, 5.0 μm to 10.0 μm. Within this range, Relation 2 can be easily satisfied and the optical pattern can be easily formed.

In an embodiment, in the first optical pattern 300, h1 may be 7.0 μm to 15.0 μm, and, in an embodiment, 9.0 μm to 13.0 μm. Within this range, Relation 3 can be easily satisfied and the optical pattern can be easily formed.

The first optical pattern 300 may satisfy the following Relation 4. This can improve contrast ratio and viewing angle.

Relation 4

$$1 < p/w1 \leq 10, \tag{4}$$

where w1 (unit: μm) is the same as defined in Relation 2, and p is a pitch (unit: μm) of the patterned portion.

In an embodiment, in Formula 4, p/w1 (a ratio of p to w1) may be 1.5 to 8.

Herein, the pitch p refers to the sum (w1+w3) of w1 and a distance between a pair of adjacent first optical patterns 300, that is, the width w3. In an embodiment, the pitch p may be 3.0 μm to 20.0 μm, and, in an embodiment, 4.0 μm to 16.0 μm. Within this range, Relation 4 can be easily satisfied and the patterned portion can be easily formed. In an embodiment, w3 may be 0.1 μm to 8.0 μm, and, in an embodiment, 1.0 μm to 7.0 μm. Within this range, the first optical pattern 300 can improve viewing angle and contrast ratio.

In an embodiment, the first optical pattern 300 may have an aspect ratio of 0.1 to 3.0, and, in an embodiment, 0.1, 0.2, 0.3, 0.4, 0.5, 0.6, 0.7, 0.8, 0.9, 1.0, 1.1, 1.2, 1.3, 1.4, 1.5, 1.6, 1.7, 1.8, 1.9, 2.0, 2.1, 2.2, 2.3, 2.4, 2.5, 2.6, 2.7, 2.8, 2.9, or 3.0, and, in an embodiment, greater than 1 to 3.0 or 1.1 to 2.0. Within this range, the first optical pattern 300 can improve contrast ratio and viewing angle. Herein, "aspect ratio" is defined as a ratio of a maximum height H of the first optical pattern 300 to the maximum width w1 of the first optical pattern 300. Here, the maximum height H may be equal to the minimum distance h1, or may be greater than the minimum distance h1.

In an embodiment, the maximum height H of the first optical pattern 300 may be 7 μm to 15 μm, and, in an embodiment, 9 μm to 13 μm. Within this range, the aspect ratio of the first optical pattern 300 can easily fall within the above range.

Although not shown in FIG. 2, the multiple first optical patterns 300 may longitudinally extend to form a stripe pattern, and thus may have the same maximum height in a longitudinal direction thereof.

In an embodiment, at least one of the two side surfaces of the first optical pattern 300 may further include a second side surface connected to the first side surface 302. This will be described in further detail with reference to FIG. 3.

Figure 3:
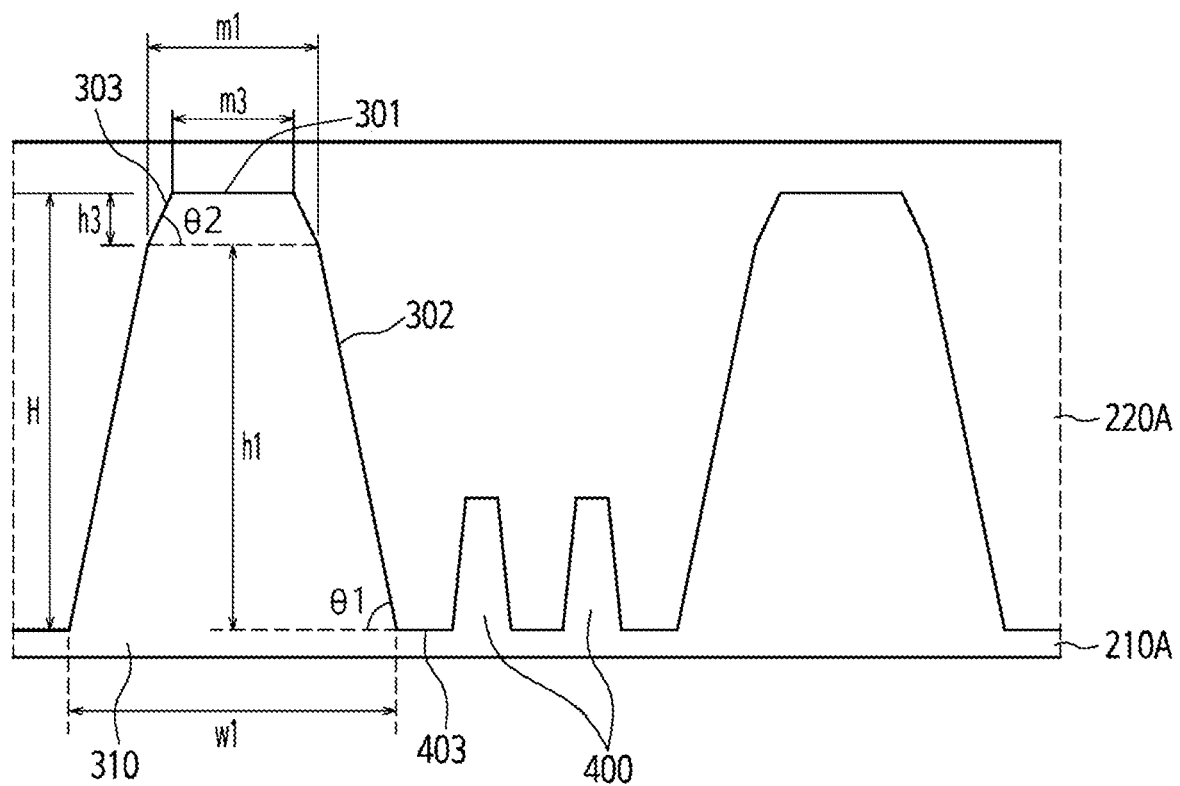
FIG. 3 is a partially enlarged cross-sectional view of the patterned portion in the transverse direction of the optical pattern, according to an embodiment of the present invention.

Referring to FIG. 3, the patterned portion includes a first resin layer 210A and a second resin layer 220A.

A first optical pattern 310 has two opposite side surfaces. Each of the side surfaces includes: a first side surface 302; and a second side surface 303 connected to the first side surface 302.

The first optical pattern 310 satisfies the following Relations 5, 6, and 7. In this way, the first optical pattern 310 can further improve the desired effects of the present invention.

Relation 5

$$0.1 \text{ μm} \leq h3 \leq h1 \times 0.4, \quad (5)$$

where h3 (unit: μm) is H−h1 (H being a maximum height of the first optical pattern 310), and h1 (unit: μm) is the same as defined in Relation 3.

Relation 6

$$\theta1 \times 0.1 \leq \theta2 < \theta1, \quad (6)$$

where θ2 (unit: °) is a base angle of the second side surface 303, and θ1 (unit: °) is a base angle of the first side surface 302.

Relation 7

$$m1 \times 0.1 \leq m3 \leq m1, \quad (7)$$

where m3 (unit: μm) is a minimum width between the two opposite second side surfaces 303, and m1 (unit: μm) is the same as defined in Relation 1.

In an embodiment, θ2 may be 50° to 85°, and, in an embodiment, 60° to 80°, and m3 may be 0.1 μm to 6 μm, and, in an embodiment, 2 μm to 5 μm. Within this range, the first optical pattern 300 can easily achieve the desired effects of the present invention.

In the first optical pattern 300, the two opposite second side surfaces 303 are connected to each other by a first surface 301.

In an embodiment, the first surface 301 may be a completely flat surface (see FIG. 1, FIG. 2, and FIG. 3) or may be a flat surface having or partially having fine unevenness. When the first surface 301 is a completely flat surface, the first optical pattern may have an N-gonal cross-section (N being an integer of 4 to 10), such as a rectangular shape, a square shape, or a trapezoidal shape.

In another embodiment, the first surface 301 may be a curved surface. Here, the first surface 301 may be convex in a direction from the first resin layer 210 toward the second resin layer 220 or in a direction from the second resin layer 220 toward the first resin layer 210. This will be described in further detail with reference to FIG. 4.

Figure 4:
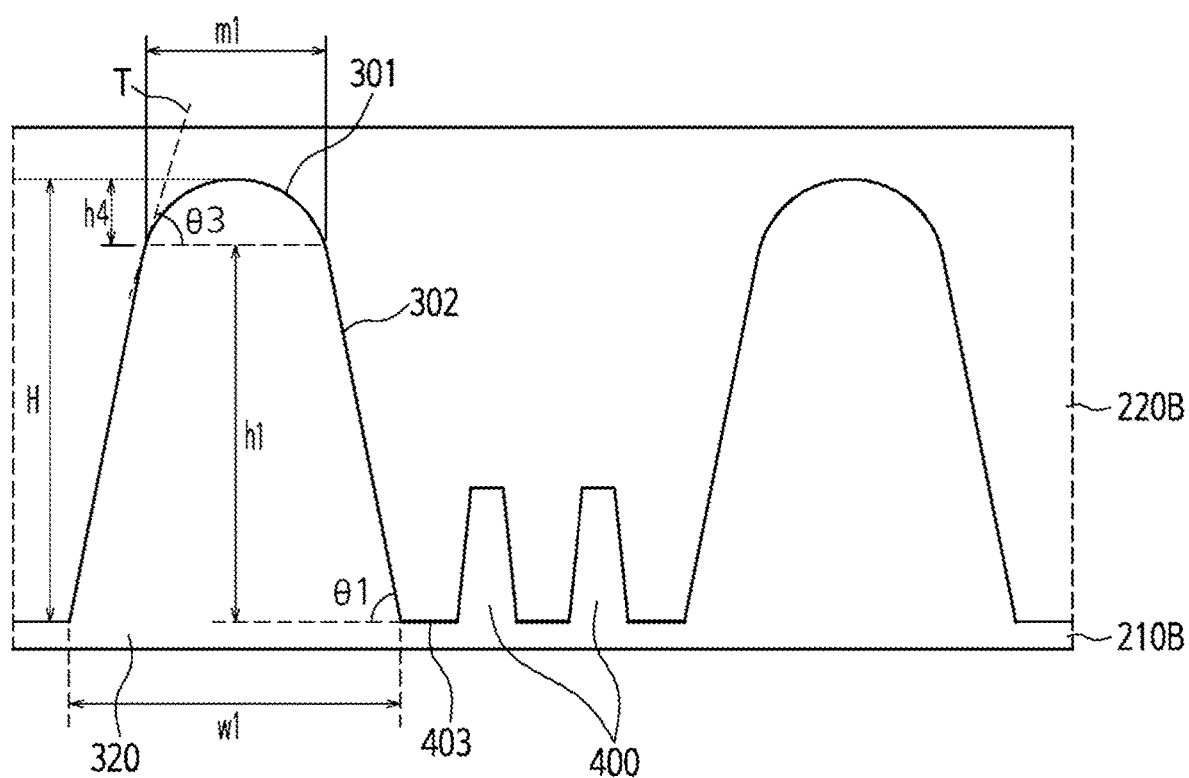
FIG. 4 is a partially enlarged cross-sectional view of the patterned portion in the transverse direction of the optical pattern, according to an embodiment of the present invention.

Referring to FIG. 4, the patterned layer includes a first resin layer 210B and a second resin layer 220B.

A first optical pattern 320 has two opposite first side surfaces 302 and a first surface 301 connecting the two first side surfaces 302 to each other. The first surface 301 is a convex curved surface in a direction from the first resin layer 210B toward the second resin layer 220B.

The first optical pattern 320 satisfies the following Relations 8 and 9. In this way, the first optical pattern 320 can further improve the desired effects of the present invention.

Relation 8

$$0.1 \text{ μm} \leq h4 \leq h1 \times 0.4, \quad (8)$$

where h4 (unit: μm) is H−h1 (H being a maximum height of the first optical pattern 320), and h1 (unit: μm) is the same as defined in Relation 3.

Relation 9

$$\theta1 \times 0.1 \leq \theta3 < \theta1, \quad (9)$$

where θ3 (unit: °) is a base angle of the first surface 301 connecting the two opposite first side surfaces 302, and θ1 (unit: °) is a base angle of the first side surface 302.

Here, θ3 is defined as an angle formed between a tangent line T to the first surface 301 and m1, that is, a minimum width between the two opposite first side surfaces 302.

In an embodiment, h4 may be 0.1 μm to 6 μm, for example, 1 μm to 1.8 μm. In an embodiment, θ3 may be 40° to 80°, for example, 50° to 75°. Within these ranges, the first optical pattern 320 can easily achieve the desired effects of the present invention.

Second Optical Pattern

Although the second optical pattern 400 is additionally formed between each pair of adjacent first optical patterns 300, the second optical pattern 400 can reduce reflective rainbow without adversely affecting improvement in contrast ratio and viewing angle by satisfying Relations 1 to 3.

In an embodiment, when two or more second optical patterns 400 are formed between each pair of adjacent first optical patterns 300, the second optical patterns 400 may be the same in shape (for example, height, width, and the like) as each other and may be arranged at regular intervals, unlike a fine unevenness (generally having an irregular shape or an irregular width or an irregular space).

Although not shown in FIG. 2, the second optical patterns 400 may extend in the same direction as the longitudinal direction of the first optical pattern 300 to form a stripe pattern, and thus may have a same maximum height in a longitudinal direction thereof.

The second optical pattern 400 may be an embossed optical pattern protruding from the first resin layer 210 toward the second resin layer 220.

The second optical pattern 400 may include a second surface 401 formed on a top thereof and two second side surfaces 402 connected to the second surface 401.

The second surface 401 is formed on the top of the second optical pattern 400 and reduces reflective rainbow.

The second surface 401 may be a generally flat surface as shown in FIG. 2, or may be a flat surface having or partially having fine unevenness. In an embodiment, the second surface 401 may have a width m2 of 0.1 μm to 2.0 μm, for example, 0.1 μm, 0.2 μm, 0.3 μm, 0.4 μm, 0.5 μm, 0.6 μm, 0.7 μm, 0.8 μm, 0.9 μm, 1.0 μm, 1.1 μm, 1.2 μm, 1.3 μm, 1.4 μm, 1.5, μm, 1.6 μm, 1.7, μm, 1.8 μm, 1.9, μm, or 2.0 μm, and, in an embodiment, 0.4 μm to 1.5 μm. Within this range, Relation 1 can be easily satisfied and improvement in viewing angle and contrast ratio can be easily achieved.

In another embodiment, the second surface 401 may be a curved surface.

The second side surface 402 may include one or more, for example, one to three flat surfaces.

In an embodiment, the second side surface 402 may include one flat surface, as shown in FIG. 2.

In another embodiment, the second side surface 402 may include two or more flat surfaces. In this case, each of the flat surfaces may have a different base angle θ with respect to the maximum width w2 of the second optical pattern. Herein, the base angle θ refers to an angle formed between a corresponding one of the flat surfaces of the second side surface 402 and the maximum width of the second optical pattern 400. In an embodiment, the second side surface 402 may be a polygonal surface which is convex in a direction from the first resin layer 210 toward the second resin layer 220, or may be a polygonal surface which is concave in a direction from the first resin layer 210 toward the second resin layer 220. In an embodiment, the base angle θ may be 60° to 90°, for example, 60°, 61°, 62°, 63°, 64°, 65°, 66°, 67°, 68°, 69°, 70°, 71°, 72°, 73°, 74°, 75°, 76°, 77°, 78°, 79°, 80°, 81°, 82°, 83°, 84°, 85°, 86°, 87°, 88°, 89°, or 90°, for example, 75° to 90°. Within this range, the second optical pattern 400 can easily achieve the desired effects of the present invention. For example, the second optical pattern 400 may have an N-gonal cross-section (N being an integer from 3 to 10), such as a trapezoidal shape, a rectangular shape, or a square shape.

In another embodiment, the second side surface 402 may include one or more, for example, one to three curved surfaces. In an embodiment, the second side surface 402 may include one curved surface. In another embodiment, the second side surface 402 may include two or more curved surfaces. In this case, each of the curved surfaces may have a different base angle with respect to the maximum width of the second optical pattern 400. Here, the base angle θ refers to an angle formed between a corresponding one of the curved surfaces of the second side surface 402 and the maximum width of the second optical pattern 400.

Here, the second side surface 402 may be convex in a direction from the first resin layer 210 toward the second resin layer 220, or may be concave in a direction from the first resin layer 210 toward the second resin layer 220. In an embodiment, the base angle θ may be 60° to 90°, for example 75° to 90°. Within this range, the second optical pattern 400 can easily achieve the desired effects of the present invention.

In an embodiment, the maximum width w2 of the second optical pattern 400 may be 0.1 μm to 5 μm, for example, 0.1 μm, 0.5 μm, 1.0 μm, 1.5 μm, 2.0 μm, 2.5 μm, 3.0 μm, 3.5 μm, 4.0 μm, 4.5 μm, or 5.0 μm, and, in an embodiment, 0.5 μm to 3 μm. Within this range, Relation 2 can be easily satisfied and the optical pattern can be easily formed.

In an embodiment, the maximum height h2 of the second optical pattern may be 0.1 μm to 3.0 μm, for example, 0.1 μm, 0.5 μm, 1.0 μm, 1.5 μm, 2.0 μm, 2.5 μm, or 3.0 μm, and, in an embodiment, 0.5 μm to 2.5 μm. Within this range, Relation 3 can be easily satisfied and the optical pattern can be easily formed.

In an embodiment, the second optical pattern 400 may have a smaller aspect ratio than the first optical pattern 300. In this way, the second optical pattern 400 can significantly reduce reflective rainbow without adversely affecting improvement in contrast ratio and viewing angle. In an embodiment, a difference in aspect ratio between the first optical pattern and the second optical pattern may be 0.5 or less, for example, 0.1, 0.15, 0.2, 0.25, 0.3, 0.35, 0.4, 0.45, or 0.5, for example, 0.1 to 0.5.

In an embodiment, the second optical pattern 400 may have a base angle smaller than or equal to that of the first optical pattern 300. In this way, the second optical pattern 400 can significantly reduce reflective rainbow without adversely affecting improvement in contrast ratio and viewing angle. In an embodiment, a difference in base angle between the first optical pattern 300 and the second optical pattern 400 may be 30° or less, for example, 0°, 1°, 2°, 3°, 4°, 5°, 6°, 7°, 8°, 9°, 10°, 11°, 12°, 13°, 14°, 15°, 16°, 17°, 18°, 19°, 20°, 21°, 22°, 23°, 24°, 25°, 26°, 27°, 28°, 29°, or 30°, for example, 0° to 30°.

In an embodiment, the second optical pattern 400 may have a same cross-sectional shape as the first optical pattern 300 or may have a different cross-sectional shape than the first optical pattern 300. For example, when the second optical pattern 400 has a trapezoidal cross-sectional shape, the first optical pattern 300 may also have a trapezoidal cross-sectional shape.

Next, a method of forming the patterned portion according to an embodiment will be described. However, the present invention is not limited thereto.

First, multiple engraved optical patterns each having a same shape as the first optical pattern are formed on a copper foil, followed by forming an engraved optical pattern having a same shape as the second optical pattern between each pair of adjacent engraved optical patterns formed on the copper foil using a diamond lapping film, thereby forming a carving pattern for formation of the first optical pattern and the second optical pattern. Then, after a composition for the second resin layer is coated to a thickness (e.g., a predetermined thickness) onto a surface of a film for the first protective layer, the obtained carving pattern is transferred to the coating layer, followed by curing, and then the transferred pattern is filled with a composition for the first resin layer, followed by curing, thereby forming the patterned portion.

Polarizer

The polarizer 100 polarizes incoming light from a liquid crystal panel and transmits the polarized light to the patterned layer.

In an embodiment, the polarizer 100 may include a polyvinyl alcohol-based polarizer fabricated by uniaxially stretching a polyvinyl alcohol film or a polyene-based polarizer fabricated by dehydrating a polyvinyl alcohol film. The polarizer 100 may be fabricated using a polyvinyl alcohol film by a typical method known to those skilled in the art.

In an embodiment, the polarizer 100 may have a thickness of 5 μm to 40 μm. Within this range, the polarizer 100 can be used in an optical display apparatus.

First Protective Layer

The first protective layer 500 is a light-transmissive layer that can transmit light having been diffused through the patterned layer therethrough.

The first protective layer 500 may be a retardation film or an isotropic optical film which has a range (e.g., a predetermined range) of retardation. In an embodiment, the first protective layer 500 may have an Re of 8,000 nm or more, and, in an embodiment, 10,000 nm or more, and, in an embodiment, greater than 10,000 nm, and, in an embodiment, 10,100 nm to 15,000 nm. Within this range, the first protective layer 500 can prevent or substantially prevent generation of rainbow spots while further diffusing light having been diffused through the stack of the second resin layer 220 and the first resin layer 210. In another embodiment, the first protective layer 500 may be an isotropic optical film having an Re of 60 nm or less, and, in an embodiment, 0 nm to 60 nm, and, in an embodiment, 40 nm to 60 nm. Within this range, the first protective layer 500 can provide good image quality through compensation for viewing angle. Herein, the "isotropic optical film" refers to a film in which nx, ny, and nz have substantially the same value. Here, the expression "substantially the same" includes not only a case in which nx, ny, and nz have exactly the same value, but also a case in which nx, ny, and nz have insignificantly different values. In an embodiment, the first protective layer 500 is a retardation film having an Re of 8,000 nm or more, and, in an embodiment, 10,000 nm or more, and, in an embodiment, greater than 10,000 nm.

In an embodiment, the first protective layer 500 may have a thickness of 30 μm to 120 μm, and, in an embodiment, 20 μm to 80 μm. Within this range, the first protective layer 500 can be used in an optical display apparatus. In an embodiment, the first protective layer 500 may have a luminous transmittance of 80% or more, and, in an embodiment, 85% to 95%, as measured for light in the visible spectrum. The first protective layer 500 may include a film obtained by uniaxially or biaxially stretching an optically clear resin. In an embodiment, the optically clear resin may include at least one selected from among: polyesters such as polyethylene terephthalate (PET), polybutylene terephthalate, polyethylene naphthalate, and polybutylene naphthalate; acryl; cyclic olefin polymer (COP); cellulose esters such as triacetyl cellulose (TAC) resins; polyvinyl acetate; polyvinyl chloride (PVC); polynorbornene, polycarbonate (PC); polyamide; polyacetal; polyphenylene ether; polyphenylene sulfide; polysulfone; polyether sulfone; polyarylate; and polyimide. In an embodiment, the first protective layer includes a film formed of a polyester resin. The first protective layer 500 may include a film formed of the optically clear resin subjected to modification. Here, modification may include copolymerization, branching, crosslinking, modification of molecular terminals, and the like.

Although not shown in FIG. 1, the polarizing plate may further include a functional layer formed on at least one surface of the first protective layer 500 to provide additional functions. The functional layer may include any of a primer layer, a hard coating layer, and an anti-fingerprint layer, without being limited thereto.

Although not shown in FIG. 1, the polarizing plate may further include a second protective layer formed between the patterned layer and the polarizer 100, or the light incidence surface of the polarizer, that is, the lower surface of the polarizer.

An optical display apparatus according to one or more embodiments of the present invention includes the polarizing plate according to an embodiment of the present invention.

In an embodiment, the optical display apparatus may include the polarizing plate as a viewer-side polarizing plate with respect to a liquid crystal panel. Here, the "viewer-side polarizing plate" refers to a polarizing plate which is disposed on a side of a screen of the optical display apparatus with respect to the liquid crystal panel, that is, disposed opposite a light source of the optical display apparatus.

In an embodiment, a liquid crystal display apparatus may include a condensing backlight unit, a light source-side polarizing plate, a liquid crystal panel, and a viewer-side polarizing plate, which are sequentially stacked, wherein the viewer-side polarizing plate may include the polarizing plate according to the present invention. Here, "light source-side polarizing plate" refers to a polarizing plate disposed on the side of a light source of the optical display apparatus. The liquid crystal panel may employ a vertical alignment (VA) mode, an IPS mode, a patterned vertical alignment (PVA) mode, or a super-patterned vertical alignment (S-PVA) mode, without being limited thereto.

The optical display apparatus may be a foldable or flexible optical display apparatus, or may be a non-foldable or non-flexible optical display apparatus.

Next, the present invention will be described in further detail with reference to some examples. However, it should be noted that these examples are provided for illustration and are not to be construed in any way as limiting the present invention.

Example 1

A composition for the second resin layer (including a UV-curable resin, Shina T&C Co., Ltd.) was coated to a predetermined thickness on a lower surface of a polyethylene terephthalate film (without an antireflection layer).

After forming multiple engraved optical patterns each having the same shape as the first optical pattern on a copper foil, an engraved optical pattern having the same shape as the second optical pattern was formed between each pair of adjacent engraved optical patterns formed on the copper foil using a diamond lapping film, thereby forming a carving pattern for formation of the first optical pattern and the second optical pattern on the copper foil.

Then, the carving pattern was transferred from the copper foil to the obtained coating layer, followed by curing, thereby forming the second resin layer. Then, a lower surface of the second resin layer was filled with a composition for the first resin layer (including UV-curable resin, Shina T&C Co., Ltd.), followed by curing, thereby obtaining a patterned portion having a cross-section as shown in FIG. 2 (index of refraction of the first resin layer: 1.48, index of refraction of the second resin layer: 1.60). Details of the patterned portion are shown in Table 1 below.

A polarizer was fabricated by stretching a polyvinyl alcohol film to three times an initial length thereof at 60° C., adsorbing iodine to the stretched film, and further stretching the film to 2.5 times in an aqueous solution of boric acid at 40° C. Then, the obtained patterned layer was bonded to an upper surface of the fabricated polarizer, followed by bonding a cyclic olefin polymer (COP) film (ZEON Co., Ltd.) to a lower surface of the polarizer.

Example 2

A polarizing plate was fabricated in the same manner as in Example 1 except that dimensions of each optical pattern of the patterned layer were changed as listed in Table 1 below.

Comparative Example 1

A polarizing plate was fabricated in the same manner as in Example 1 except that the patterned layer was omitted. That is, the polarizing plate had a structure in which a PET film, a polarizer, and a COP film were stacked in the stated order.

Comparative Examples 2 to 7

Polarizing plates were fabricated in the same manner as in Example 1 except that dimensions of each optical pattern of the patterned layer were changed as listed in Table 1 below.

Using each of the polarizing plates fabricated in the Examples and Comparative Examples, a liquid crystal display model was fabricated and then was evaluated as to properties shown in Table 1.

Specifically, after a viewer-side polarizing plate was removed from a liquid crystal panel (55 inch UHD TV, model number: UN55KS8000F, Samsung Electronics), each of the polarizing plates fabricated in the Examples and Comparative Examples was attached to the liquid crystal panel as a viewer-side polarizing plate, thereby fabricating a model for measurement of viewing angle. In the model for measurement of viewing angle, a light source-side polarizing plate had a structure in which a COP film, a polarizer, and a PET film were stacked in the stated order.

The model for measurement of viewing angle was evaluated as to the following properties and results are shown in Table 1.

(1) Relative luminance (unit: %), relative contrast ratio (unit: %): Luminance of the fabricated liquid crystal display model when viewed from the front (0°), the right side (90°), and the left side (−90°) in a spherical coordinate system was measured in both white mode and black mode using an EZCONTRAST X88RC (EZXL-176R-F422A4, ELDIM S.A.). Relative luminance was calculated as {(luminance of each of the liquid crystal display models fabricated in the Examples and Comparative Examples)/(luminance of the liquid crystal display model fabricated in Comparative Example 1)}×100. Contrast ratio was calculated as a ratio of luminance in white mode to luminance in black mode. Relative contrast was calculated as {(contrast ratio of each of the liquid crystal display models fabricated in the Examples and Comparative Examples)/(contrast ratio of the liquid crystal display model fabricated in Comparative Example 1)}×100.

(2) Ratio of lateral contrast ratio to front contrast ratio (@white mode, @black mode, unit: %): A ratio of lateral contrast ratio to front contrast ratio was measured in the same manner as in (1). In each of white mode and black mode, {(lateral contrast ratio to front contrast ratio)}×100 was calculated.

(3) Viewing angle (unit: °): Viewing angle was measured in the same manner as in (1). Viewing angle was determined as an angle at which luminance of each of the fabricated liquid crystal display models was 75% and 50% of front luminance of the liquid crystal display model. A higher viewing angle indicates better visibility.

(4) Reflective rainbow: The fabricated liquid crystal display models were compared as to intensity of reflective rainbow in an "Off" state under illumination with a three-wavelength lamp. Reflective rainbow was evaluated with the naked eye on a scale of 1 to 10. A lower score indicates better reduction in reflective rainbow.

TABLE 1

| | | Example | | Comparative Example | | | | | | |
|---|---|---|---|---|---|---|---|---|---|---|
| | | 1 | 2 | 1 | 2 | 3 | 4 | 5 | 6 | 7 |
| First optical pattern | m1 | 6 | 6 | 6 | 6 | 6 | 6 | 6 | 6 | 6 |
| | h1 | 11 | 11 | 11 | 11 | 11 | 11 | 11 | 11 | 11 |
| | w1 | 9 | 9 | 9 | 9 | 9 | 9 | 9 | 9 | 9 |
| | w3 | 7 | 7 | 7 | 7 | 7 | 7 | 7 | 15 | 19 |
| | θ1 | 75 | 75 | 75 | 75 | 75 | 75 | 75 | 75 | 75 |
| Second optical pattern | m2 | 1.2 | 0.6 | — | 1.4 | 2.3 | 1.2 | 1.2 | 1.2 | 1.2 |
| | h2 | 2.2 | 1.1 | — | 2.2 | 2.2 | 4.4 | 6.6 | 2.2 | 2.2 |
| | w2 | 2.5 | 1 | — | 2.5 | 2.5 | 2.5 | 2.5 | 6.3 | 8.1 |
| | θ | 75 | 75 | — | 75 | 75 | 75 | 75 | 75 | 75 |
| | w5 | 1 | 1 | — | 1 | 1 | 1 | 1 | 1 | 1 |
| Relation 1 | | ○ | ○ | — | x | X | ○ | ○ | ○ | ○ |
| Relation 2 | | ○ | ○ | — | ○ | ○ | ○ | ○ | x | x |
| Relation 3 | | ○ | ○ | — | ○ | ○ | x | x | ○ | ○ |
| Arrangement shape | | FIG. 1 | FIG. 1 | FIG. 1 | FIG. 1 | FIG. 1 | FIG. 1 | FIG. 1 | FIG. 1 | FIG. 1 |
| Relative luminance | White | 105 | 103 | 100 | 104 | 108 | 115 | 120 | 112 | 114 |
| | Black | 97 | 98 | 100 | 100 | 100 | 103 | 110 | 103 | 105 |
| Relative contrast ratio | Front | 102 | 104 | 100 | 104 | 108 | 113 | 116 | 108 | 110 |
| | 60° | 103 | 103 | 100 | 100 | 100 | 98 | 96 | 94 | 93 |
| Ratio of lateral contrast ratio to front contrast ratio (white) | 30° | 52 | 53 | 51 | 49 | 47 | 46 | 45 | 48 | 48 |
| Ratio of lateral contrast ratio to front contrast ratio (black) | 30° | 2.49 | 2.52 | 2.59 | 2.53 | 2.54 | 2.55 | 2.56 | 2.53 | 2.54 |
| | 60° | 2.82 | 2.93 | 3.55 | 2.9 | 3.02 | 3.4 | 3.5 | 3.1 | 3.1 |
| Viewing angle | 75% | 36 | 34 | 37.8 | 35 | 35 | 34 | 32 | 33 | 33 |
| | 50% | 63 | 61 | 60.9 | 59 | 58 | 55 | 55 | 57 | 57 |
| Reflective rainbow | | 3.5 | 4 | 6 | 6 | 6 | 6 | 7 | 7 | 7 |

As shown in Table 1, the polarizing plate according to the present invention could improve front/lateral contrast ratio and viewing angle in the operation state while reducing reflective rainbow in the non-operation state.

By contrast, the polarizing plate of Comparative Example 1, not including the second optical pattern, failed to achieve all of the desired effects of the present invention. In addition, the polarizing plates of Comparative Examples 2 to 7, not satisfying all of Relations 1, 2, and 3 set forth herein despite including the second optical pattern, also failed to achieve all of the desired effects of the present invention.

While some embodiments of the present invention have been described herein, it is to be understood that various modifications, changes, alterations, and equivalent embodiments can be made by those skilled in the art without departing from the spirit and scope of the invention.

What is claimed is:
1. A polarizing plate comprising:
a polarizer; and
a patterned portion comprising a first resin layer and a second resin layer stacked on at least one surface of the polarizer, the first resin layer having a different index of refraction from the second resin layer, wherein the first resin layer is a patterned layer comprising: multiple first optical patterns formed at intervals at an interface with the second resin layer; and one or more second optical patterns formed between each pair of adjacent first optical patterns, a first optical pattern of the multiple first optical patterns has two opposite side surfaces each at least comprising a first side surface having a base angle, and the first optical pattern and a second optical pattern of the one or more second optical patterns satisfy the following Relations 1 to 3:

$$0.1 \text{ μm} \le m2 \le m1 \times 0.2, \quad (1)$$

$$0.1 \text{ μm} \le w2 \le w1 \times 0.5, \quad (2)$$

$$0.1 \text{ μm} \le h2 \le h1 \times 0.2, \quad (3)$$

where m1 is a minimum width (unit: μm) between the opposite first side surfaces of the first optical pattern, w1 is a maximum width (unit: μm) between the opposite first side surfaces of the first optical pattern, h1 is a minimum distance (unit: μm) between the minimum width and the maximum width of the first optical pattern, m2 is a maximum width (unit: μm) of a second surface formed at a top portion of the second optical pattern, w2 is a maximum width (unit: μm) of the second optical pattern, and h2 is a maximum height (unit: μm) of the second optical pattern.

2. The polarizing plate according to claim 1, wherein the second optical patterns are formed at both sides of the first optical pattern with a space between the second optical pattern and the first optical pattern.

3. The polarizing plate according to claim 1, wherein the second optical patterns are formed at one side of the first optical pattern with a space between the second optical pattern and the first optical pattern.

4. The polarizing plate according to claim 3, wherein the patterned portion has a region in which there is no second optical pattern formed between a pair of adjacent first optical patterns.

5. The polarizing plate according to claim 1, wherein the second optical pattern has a smaller aspect ratio than the first optical pattern.

6. The polarizing plate according to claim 1, wherein a difference in aspect ratio between the first optical pattern and the second optical pattern is 0.5 or less.

7. The polarizing plate according to claim 1, wherein one or two second optical patterns are formed between each pair of adjacent first optical patterns.

8. The polarizing plate according to claim 1, wherein the one or more second optical patterns longitudinally extend to form a stripe pattern.

9. The polarizing plate according to claim 1, wherein the one or more second optical patterns have a same maximum height in a longitudinal direction thereof.

10. The polarizing plate according to claim 1, wherein the one or more second optical patterns comprise second optical patterns spaced apart from each other.

11. The polarizing plate according to claim 1, wherein the patterned portion comprises multiple pattern groups each comprising the first optical pattern and the second optical pattern, and a distance between a pair of adjacent second optical patterns is the same in each pattern group.

12. The polarizing plate according to claim 1, wherein the second optical pattern is an embossed optical pattern comprising the second surface and two side surfaces connected to the second surface.

13. The polarizing plate according to claim 1, wherein the second optical pattern has a maximum width of 0.1 μm to 5 μm and a maximum height of 0.1 μm to 3.0 μm, and the second surface has a width of 0.1 μm to 2.0 μm.

14. The polarizing plate according to claim 1, wherein the first optical patterns longitudinally extend to form a stripe pattern.

15. The polarizing plate according to claim 1, wherein the first optical patterns have a same maximum height in a longitudinal direction thereof.

16. The polarizing plate according to claim 1, wherein the first optical pattern has a base angle of 60° to 90° and satisfies the following Relation 4:

$$1 < p/w1 \le 10, \quad (4)$$

where p is a pitch (unit: μm) of the patterned portion.

17. The polarizing plate according to claim 1, wherein the first optical pattern is an embossed optical pattern comprising a first surface and two side surfaces connected to the first surface.

18. The polarizing plate according to claim 1, wherein the second optical pattern has a same cross-sectional shape as that of the first optical pattern.

19. The polarizing plate according to claim 1, wherein a difference in index of refraction between the first resin layer and the second resin layer is 0.5 or less.

20. An optical display apparatus comprising the polarizing plate according to claim 1.

* * * * *